April 10, 1951     C. DREXLER     2,548,709
OVERLOAD AUTOMATIC REVERSIBLE CONTROL
Filed Sept. 12, 1946     3 Sheets-Sheet 1

INVENTOR.
CHARLES DREXLER.

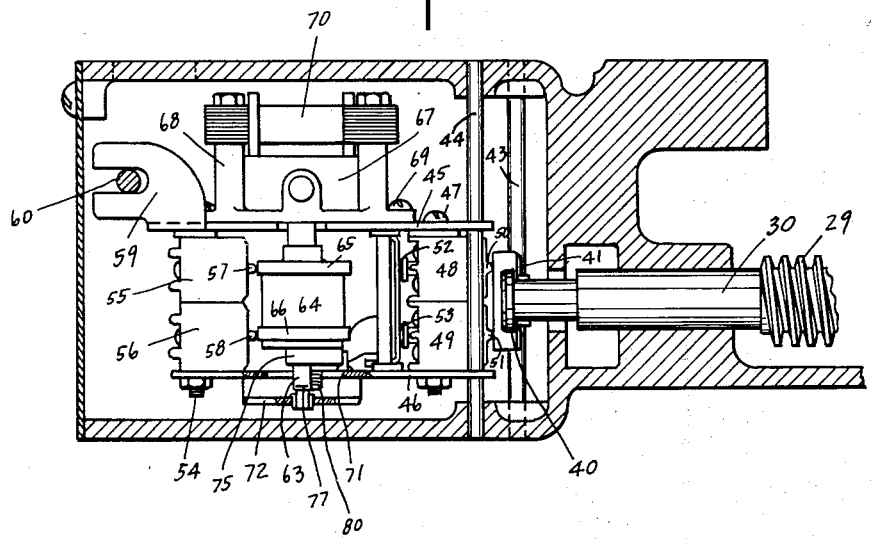
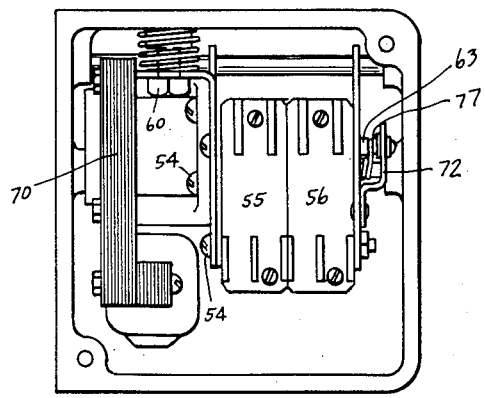

April 10, 1951 C. DREXLER 2,548,709
OVERLOAD AUTOMATIC REVERSIBLE CONTROL
Filed Sept. 12, 1946 3 Sheets-Sheet 3
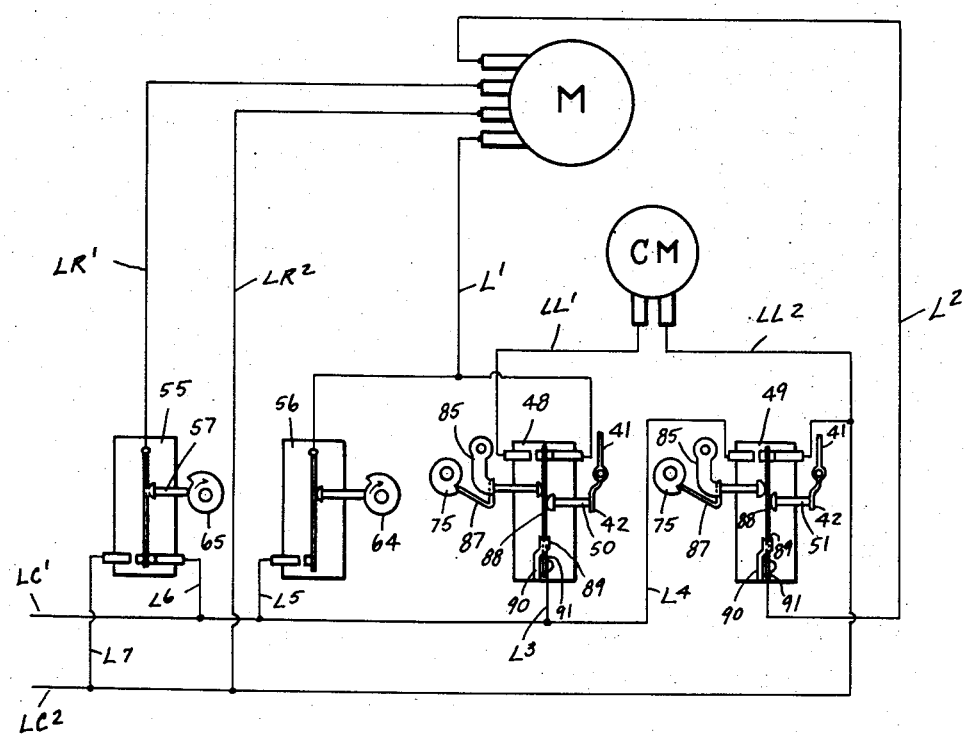
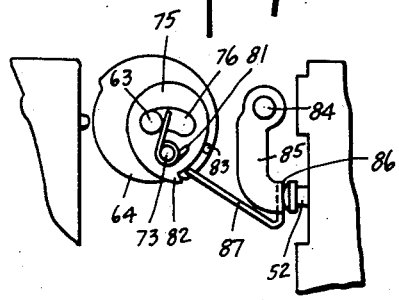
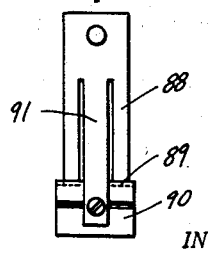
INVENTOR.
CHARLES DREXLER.
BY
Lockwood, Goldsmith & Galt,
ATTORNEYS.

Patented Apr. 10, 1951

2,548,709

UNITED STATES PATENT OFFICE 2,548,709

OVERLOAD AUTOMATIC REVERSIBLE CONTROL

Charles Drexler, Indianapolis, Ind.

Application September 12, 1946, Serial No. 696,589

6 Claims. (Cl. 318—475)

This invention relates to a power transmission system and, more particularly, the control for the same.

Transmission systems of the character herein disclosed are peculiarly adapted for stoker mechanisms, washing machines, etc. wherein the system may be subject to a stalling action incident to overloading.

The chief object of the present invention is to provide an automatic control for a stallable device whereby the stall device is reversely and repetitiously actuated to remove the stalling load therefrom.

In stoker devices it is customary to employ a feed screw inside of a tube to supply a solid fuel from the bin or hopper to the retort. Occasionally foreign material is encountered in stoker operation, such as hard rock, etc. or the stoker operator may allow clinkers to accumulate and form a bridge or obstruction over the retort. In either case, increased torque is required to turn the feed screw for the crushing of the rock or the building up of enough pressure on the coal supplied by the tube to break through the clinker bridge.

In certain instances the increased torque required to overcome an obstruction of the character specified may be greater than the maximum torque of the motor. Heretofore, releasing devices have been provided to prevent motor burning out, such as shear pins, overload releasing clutches, etc., the purpose of which is to disconnect the motor from the screw, whereupon the stoker ceases to function until the operator personally removes the obstruction and resets the releasing clutch or replaces the shear pin.

It has been ascertained that, generally speaking, it is possible to remove such obstruction by breaking it up or dislodging it by rocking the feed screw, inside the supply tube or retort, backward and forward. This is extremely tedious when manually effected.

The present invention contemplates automatic rocking of the screw backward and forward, as hereinafter more fully pointed out. Such automatic rocking is continued until the obstruction is removed and the motor continues rotating in its general or forward direction necessary for feeding fuel to the retort.

Herein, although not illustrated, the invention contemplates the provision of a small amount of back lash between the gear box drive shaft and the coal feed screw. If, as is commonly the case, the gear ratio is approximately one thousand to one, the back lash is in effect multiplied about one thousand times at the motor. This permits the motor to start unloaded, as it were, and have the rotor get up to normal motor speed before the back lash is taken up. Hence, the inertia of the rotor at full speed, being suddenly applied to the clogged feed screw when it is stalled by an obstruction, builds up momentarily torque greatly in excess of the maximum, steady or normal torque of the motor.

Therefore, the chief feature of the invention resides in providing a reversible motor for a power driving system and associating therewith a control which is automatically operable to secure cessation of motor rotation upon load stalling, which control is further characterized by reversal of the motor and operation thereof in the reverse direction for a predetermined interval and then the automatic reestablishment of the original motor circuit for normal forward driving of the motor, the same being continued at that time or at a subsequent time following a plurality of reversing cycles when the obstruction is removed, overcome or broken up for the continued forward travel of the fuel by reason of the continued forward rotation of the motor.

Other objects and features of the invention will be more fully set forth hereinafter.

The full nature of the invention will be understood from the accompanying drawings and the following description and claims:

In the drawings:

Fig. 3 is a top plan view of the control mechanism shown in Fig. 1.

Fig. 4 is an end elevation of the same.

Fig. 5 is a diagrammatic view of the circuit arrangement, certain of the parts being shown in duplicate for the purpose of clarity.

Fig. 6 is an elevation showing the snap type of switch.

Fig. 7 is an enlarged view, in detail, of the snap action restoring cam.

Figure 2:
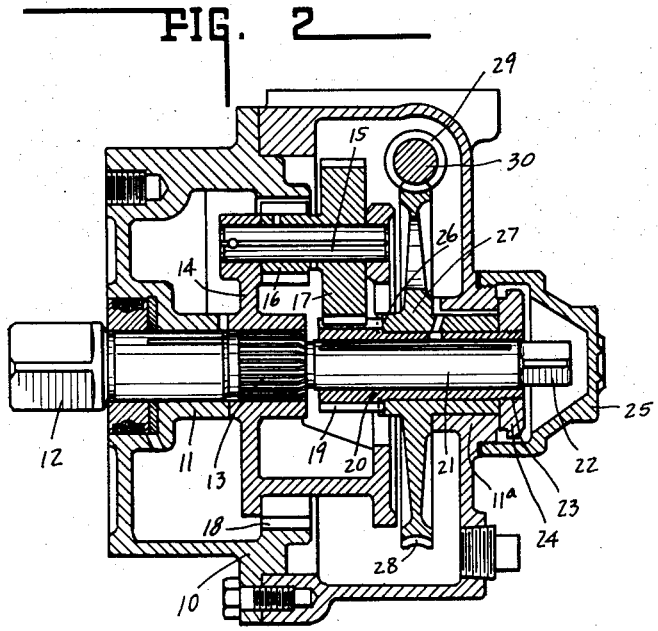
Fig. 2 is a central sectional view through the power transmission system to which the invention is applied.

In Fig. 2 of the drawings 10 indicates a two-part housing provided with axially aligned bearings 11 and 11a at opposite ends. A shaft having one end 12 exposed is adapted for connection to a fuel feeding worm or screw in a retort supply tube for feeding fuel to the retort from a hopper or bin. Within the housing 10 and splined to the shaft 12 as at 13 is a pinion carrier 14 mounting parallel shafts 15 on which are mounted the unitary pinions 16 and 17. The member 14 in effect constitutes an open cage. Adjacent thereto the housing 10 upon its interior is provided with the internal gear 18 with which mesh the pinion portions 16. The pinion portions 17 mesh with a sun gear 19 carried by a sleeve 20 that is rotatably supported upon the portion 21 of the aforesaid central shaft, the latter portion being exposed beyond the bearing 11a and being squared as at 22 for tool application for manual manipulation.

The opposite end of the sleeve 20 is threaded as at 23 to take the cap nut 24 to retain the parts in assembled relation. A cover cap 25 may be provided to enclose the aforesaid nut and shaft end 22. Interposed between the bearing 11a and the sun gear 19 and tooth-connected thereto as at 26 is the hub portion 27 of a worm wheel 28, the latter meshing with the worm 29 carried by the shaft 30, see Fig. 1.

It will be quite obvious that upon removal of cover cap 25 and the application of the crank tool to the end 22, the stoker worm or feed screw can be backed off and advanced manually. It will also be obvious that the entire shaft 12—13, 21—22 upon removal of the nut 24 can be removed toward the left from the transmission housing. All of the aforesaid is more or less broadly disclosed in the co-pending Brownlee application Serial No. 537,209, filed May 25, 1944, now Patent No. 2,452,178 and entitled Power Transmission System.

Figure 1:
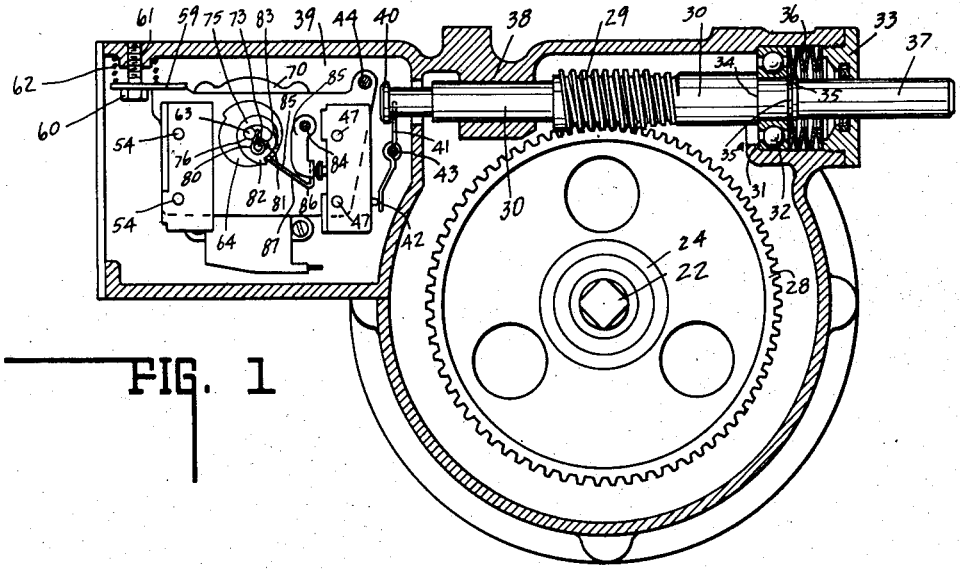
Fig. 1 is a combined sectional and elevational view of a load transmitting worm and wheel structure with the invention applied thereto, the latter being shown in elevation.

Referring more particularly to Fig. 1, it will be noted that as shown in the aforementioned application and the companion continuation-in-part application, there is herein provided in the housing 10 a shoulder 31 which, like the first mentioned application, is directly associated with a ball race structure 32 in turn operatively associated with a plurality of dished, conical, metal washers 36, the same being of resilient character and arranged in opposed relation as illustrated, and retained in proper assembled and compressed relation as determined by the number of washers and the retainer 33. The ball race 32 operatively bears on the shoulder 34 of shaft 30 and is locked to the shaft by the split ring 35 seated in groove 35a of said shaft 30.

The projecting end of the shaft 30, herein designated by the numeral 37, is adapted for connection to a reversible single phase induction motor shown only in the wiring diagram Fig. 5. The other end of said shaft 30 is rotatably supported in the bearing 38 and also slidably supported therein and extends into a housing 39 and terminates in a shoulder 40. Juxtapositioned to the terminating end of this worm shaft is a lever type member having a yoke portion 41 and the contact portion 42 and being pivotally supported upon the transverse member 43 in the housing 39. Upon stalling, due to overload, the shaft 30 moves to the right in opposition to the pre-loading applied by the springs 36.

The member 42 (or rather, the terminating end) is of appreciable width, see Fig. 3.

In the chamber 39 there is pivotally supported on the transverse member 44, a pair of brackets or plates 45 and 46, see Fig. 3. A pair of bolts 47 extends through the two plates and through a pair of switches 48 and 49, each of which has a contact member 50 and 51 respectively, and a setting member 52 and 53, respectively, the two projecting oppositely to form the respective switch.

Also carried by another pair of connecting bolts 54, that connect the two plates 45 and 46 together, are the switches 55 and 56, each having a contact member 57 and 58 projecting therefrom respectively toward the other switches and the actuating members 52 and 53 thereof.

Rigid with the plate 45 is an offset ear 59 and a bolt 60 has threaded engagement as at 61, see Fig. 1, with the housing structure forming the chamber 39. Interposed between that housing and the ear is the spring 62. Normally this spring 62 constrains the entire assembly of brackets and switches towards counter-clockwise rotation upon member 44 and such movement is limited by bolt 60.

Between the two sets of switches aforesaid, see Fig. 3, there is rotatably supported by said brackets a shaft 63. Said shaft mounts a cam member 64 having cam portions 65 and 66 thereon. This cam member 64 is rigid with the last gear of a clock gear train within a clock gear housing 67 carried by the frame 68 secured as at 69 to the plate or bracket 45. 70 indicates broadly the induction type clock motor that has its rotor connected to the other end of the gear train, which gear train constitutes a reduction gear arrangement.

The switches 48 and 49 are of the snap switch type more particularly illustrated in Fig. 6. In this figure there is provided a snap blade 88 carrying contacts on its opposite faces at its free end. The upper edge of this blade 88 bears in a grooved seat 89 in the support 90. The blade is slit part way down and is provided with an extension tongue 91, which is secured on the support 90. The blade 88 is under tension so that when it passes dead center in either direction, it will snap to its final position and stay there until it is moved in the opposite direction.

Switches 55 and 56 are of the spring blade, non-snap type.

In normal running the members 50 of switch 48 and 51 of switch 49 are in their retracted position so that switch arms of these switches are in the position illustrated in Fig. 5, with LC1 connected to L1 through switch 48, and LC2 connected to L2 through switch 49; also the contact arm of switch 55 is normally biased to connect line LC1 through L6 with LR1, and line LR2 is directly connected with line LC2; the motor M is driving in a forward direction.

Upon stalling, the yoke 41 is moved to the right, Fig. 1, which rocks the contact portion 42 to engage contact members 50 and 51 to snap the spring contact members of switches 48 and 49 in the opposite direction, thereby opening the circuit LC1, L1 and LC2, L2; this stops the forward drive of the motor M. Due to a snap action of switches 48 and 49, which snap in a reverse direction, LC1 is connected through L3 and switch 48 with LL1 of motor CM and LL2 being directly connected to LC2, motor CM is energized and starts to rotate cams 65 and 66. Cam 65 operating contact member 57 operates switch 55 to connect LC2 through L7 with LR1. LR2 is directly connected to line. Cam 66 operating on contact member 58 closes switch 56 against its biased opposition, resulting in LC1 being connected by L5 through switch 56 with L1. Switch 49 having been actuated by member 51 is snapped in its opposite direction resulting in the connecting of L4 with L2. As long as cam 65 and 66 maintain contact members 57 and 58 in their projected position, the motor M will run in a reverse direction, and this reverse drive of the motor is maintained for a predetermined interval, depending upon the length of the cams. However, the clock motor CM will continue to run even though switches 55 and 56 are open due to the fact that switch 48 is a snap switch and will not change direction until positively moved in a reverse direction. The operation of the switches 48 and 49 for effecting stoppage of the clock motor and closing the circuit of the motor M for forward direction will appear more fully hereinafter.

As hereinafter set forth, after the stoker motor has been de-energized for a suitable interval long enough for the motor M rotor to come to rest, the cam arrangements 64—65—66 previously broadly described now engage the members 57 and 58 to close the main motor circuit to obtain reverse rotation of the power motor M. All this time the clock motor circuit is still energized.

This reversal circuit for the power motor M is maintained for a predetermined interval, whereupon it is discontinued. The clock motor remains energized for an additional interval following opening of the power motor reversal circuit until by snap action the clock motor circuit is opened and the normal load power motor circuit is reestablished.

Normal running position, see Fig. 5, requires members 52 and 53 to be moved to separation. Mains LC1 and LC2 supplying alternating current then are connected to L1 and L2 and lines LR1 and LR2 respectively, through lines L3 and L6. Upon stalling members 50—51 move towards each other, whereupon main LC2 is direct to CM motor line LL2 and the return to line LC1 is through line LL1. Motor M circuit is now open at switch 48 even though lead L2 is now connected to main LC1 by line L4.

When members 57 and 58 are not active, the main motor circuit is as above described. When said members are moved together the line LR1 connects to main LC2 by line L7 and the main LR2 remains connected to said main. However, switch 56 by line 56 now connects motor lead L1 to line LC1.

When the members 52 and 53 are moved apart the initially described normal running circuit is reestablished and the clock motor circuit is opened at switch 48 to line LL1. The clock motor thus is unidirectionally rotatable and the main motor is reversely rotatable intermittently.

The clock motor CM in one example is of the synchronous type and the reduction gearing aforesaid (67) is arranged to rotate the output shaft carrying the cam construction at 4 R. P. M. Therefore, the time cycle is 15 seconds or thereabouts. The duration of power reversal is approximately 8 seconds, leaving approximately 6 seconds in the cycle, 3 of which are utilized at the beginning to permit the rotor of the master motor M to come to rest and the balance for a like purpose when the rotor is to be stopped from reversing and re-starting in the forward direction.

It has been found most desirable to rotate the feed screw (not shown) at a rate of not more than ¼ of a revolution in the reverse direction for the obstruction may then act as a nut and pull the screw off the square end 12 of the power shaft, it being a mere slip connection with the screw (not shown).

In the event in the foregoing action the obstruction is not cleared or broken up, it will be quite obvious that the motor M will be energized for forward travel and there will again be an overload and the cycle will be repeated and this will occur as often as necessary until the obstruction has been removed or has been broken up. This control and this operation is automatic.

When the obstruction is finally broken up or removed, the power motor M continues to operate the shaft 12 in the forward driving direction for the feeding of solid fuel to the retort.

It will be recalled that initially herein it was disclosed that there was a certain amount of slack or back lash inherent in the construction, so that whenever the rotor of the master motor M started to rotate that it got up to speed before the load came on. In effect, therefore, the alternate rocking of the feed screw is accompanied by an impact initiation in opposite directions. Impact initiation in the reverse direction will free the screw of the locking effect of the obstruction. Subsequently, forward travel of the screw will be of the shock type imposed upon the obstruction, resulting in the shattering or breaking up of the same.

Therefore, the invention is directed to automatic reversal of the cyclic or repetitious type with or without impact initiation in the forward or reverse directions, as desired or required.

Reference will now be had more particularly to Figs. 1, 3 and 4, wherein certain of the parts broadly described heretofore are illustrated.

For present purposes it may be assumed that what is illustrated in Figs. 3 and 4 is stationarily mounted. In Figs. 1 and 3, 63 indicates the clock train output shaft to which is suitably secured the dual cam 64. Bracket 46 is recessed at 71 so that outboard bearing 72 is provided in the form of an offset bracket.

Pivoted on pin 73, see Fig. 1, carried by the adjacent end of cam 64 is snap cam 75 having arcuate slot 76 therein to accommodate shaft 63 aforesaid. This shaft is channeled or grooved at 77, see Fig. 4, to take one end of torsion spring 80 wound about pin 73 and having its other end anchored to the cam at 81. The snap cam has toe 82.

Adjacent the cam 75 and carried by the adjacent end of cam 64 is pin 83. Pivotally supported upon transverse member 84 are the ears 85 connected as at 86 to lie adjacent actuating portions 52 and 53 of switches 48 and 49. Projecting therefrom is tail portion 87.

As a result of the action of the member 86 engaging contact members 52 and 53, snap switches 48 and 49 are moved back to their original position for forward running of the motor M and the opening of the circuit of motor CM.

As illustrated, the forward running and clock starting switches are single pole double throw switches. When the power motor circuit is opened and clock motor circuit established, the cam 64 rotates clockwise, see Fig. 1. At the appropriate time, the high points on the cam 64 (65—66) close the power motor circuit for reverse rotation of the power motor and hold same closed for high point duration. Then these switches open, opening the power motor reversing circuit. All this time the clock motor circuit is closed and the forward rotation circuit of the power motor is open.

Following opening of the power motor reversal circuit the cam further rotates and the snap cam 75 rotates therewith, same having its toe 82 constrained by spring 80 in the direction of rotation.

In cam rotation the toe of the snap cam contacts the stationary pin 83 and is held back and the cam pivots upon pin 73 until the toe can pass under the stationary pin. Spring 80 then swings the snap cam 75 around to the limit of slot 76, during which movement toe 82 strikes arm 87 of switch actuator 85. This action is of snap or quick action type.

Thus member 86 engages members 52 and 53 to close the main motor switches and open the clock motor switches, thus re-establishing the initial or normal running condition. If the overload persists the member 42 is overload-actuated to open the main motor switches and close the clock motor switches for a second cycle as described. This is repeated as often as necessary.

While the invention has been illustrated and described in great detail in the drawings and foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. In a structure having a load stallable power operable device, a reversible electric motor for reversibly driving the same, a positive mechanical connection therebetween and a motor controlled circuit, switch means in said circuit operable upon mechanical overload of the device for stopping motor driving of the device, the combination therewith of cyclic operable unidirectionally rotatable means, a unidirectional motor for operating said means, switching means for controlling the circuit of said unidirectional motor, operable with said first mentioned switch means for closing the circuit through said unidirectional motor, other switch means in the motor circuit for the first motor for the reverse driving thereof and operated by said cyclic means for predetermined reversed motor operation, and other means operated by said cyclic operated means for operating the switch controlling said unidirectional motor to stop the same and stop the rotation of the said cyclic operating means and reclosing the first mentioned switch means for effecting the forward drive of said first mentioned electric motor.

2. Structure as defined by claim 1 wherein said cyclic operable unidirectionally rotatable means is of clock synchronous motor type energized by the operation of said first switch means.

3. Structure as defined by claim 1 wherein the cyclic operable means is repetitiously operated as long as the first mentioned switch means is repetitiously operated for motor cut-off while the overload persists.

4. In a structure having a stallable power operable device, a reversible power motor for reversibly driving same, a motor control circuit, and a switch in said circuit controlling said motor for stopping the motor upon device stalling, the combination therewith of linearly reciprocable means, automatically initiable upon switch actuation due to stalling and interposed between the device and motor, a second switch in said circuit for reversing the motor a predetermined limited amount and operable by said means, and other means operable at the end of the aforesaid predetermined reversing operation for opening the same switch and resetting said first switch for normal motor operation.

5. Structure as defined by claim 4 wherein the first mentioned means includes a unidirectional supplemental motor immediately energized upon and incident to first switch actuation due to device stalling, means operable by the supplemental motor after predetermined operation of that motor for actuating the second switch and maintaining power motor reversal for a predetermined interval and thereafter permitting opening of the second switch at the end of that interval.

6. Structure as defined by claim 5 wherein the said other means for resetting the first switch is automatically operable by said supplemental motor for deenergizing same upon first switch closing.

CHARLES DREXLER.

REFERENCES CITED

The following references are of record in the file of this patent:

UNITED STATES PATENTS

| Number | Name | Date |
|---|---|---|
| 1,854,584 | Gorman | Apr. 19, 1932 |
| 1,925,012 | Taylor | Aug. 29, 1933 |
| 2,232,545 | Lum | Feb. 18, 1941 |
| 2,387,533 | Schmucker | Oct. 23, 1945 |
| 2,425,312 | Gower | Aug. 12, 1947 |